United States Patent
Mane et al.

(10) Patent No.: US 9,422,168 B2
(45) Date of Patent: Aug. 23, 2016

(54) DISSOLVED AIR FLOTATION DEVICE FOR LIQUID CLARIFICATION

(71) Applicant: Doosan Heavy Industries and Construction Co. Ltd., Changwon, Gyeongnam (KR)

(72) Inventors: Pranay P. Mane, Lithia, FL (US); Lan Huong Doan, Brandon, FL (US); Jun Kim, Brandon, FL (US); Hyung Keun Roh, Tampa, FL (US)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 400 days.

(21) Appl. No.: 13/869,129

(22) Filed: Apr. 24, 2013

(65) Prior Publication Data

US 2014/0319036 A1 Oct. 30, 2014

(51) Int. Cl.
*C02F 1/24* (2006.01)
*B03D 1/14* (2006.01)

(52) U.S. Cl.
CPC ............... *C02F 1/24* (2013.01); *B03D 1/1431* (2013.01); *B03D 1/1475* (2013.01); *B03D 1/1493* (2013.01)

(58) Field of Classification Search
None
See application file for complete search history.

(56) References Cited

U.S. PATENT DOCUMENTS

| | | | |
|---|---|---|---|
| 2,765,919 A * | 10/1956 | Juell | 210/703 |
| 3,175,687 A | 3/1965 | Jones | |
| 3,870,635 A | 3/1975 | Clarke-Pounder | |
| 4,681,682 A * | 7/1987 | White et al. | 210/221.2 |
| 5,047,149 A | 9/1991 | Vion | |
| 6,409,944 B1 | 6/2002 | Perrin et al. | |
| 6,890,431 B1 | 5/2005 | Eades et al. | |
| 7,169,301 B2 | 1/2007 | Vion | |
| 7,175,768 B2 | 2/2007 | Vion | |
| 7,445,709 B2 | 11/2008 | Beaule et al. | |
| 7,651,620 B2 | 1/2010 | Vion | |
| 7,981,287 B2 | 7/2011 | Lambert et al. | |
| 8,114,296 B2 | 2/2012 | Chao | |
| 8,133,396 B2 | 3/2012 | Crowell | |
| 2007/0114182 A1* | 5/2007 | DePoli et al. | 210/703 |
| 2009/0211974 A1 | 8/2009 | Bonnelye et al. | |
| 2010/0038314 A1 | 2/2010 | Vion et al. | |
| 2010/0108584 A1 | 5/2010 | Magnanini | |
| 2010/0187186 A1 | 7/2010 | Howdeshell et al. | |
| 2011/0084012 A1 | 4/2011 | Yang et al. | |

(Continued)

FOREIGN PATENT DOCUMENTS

FR 2971432 A1 * 8/2012
WO 96/29134 9/1996

OTHER PUBLICATIONS

Extended European Search Report dated Jul. 16, 2014 issued in corresponding EP application No. 14165628.0.

*Primary Examiner* — Thomas M Lithgow
(74) *Attorney, Agent, or Firm* — Sughrue Mion, PLLC

(57) ABSTRACT

Disclosed is a dissolved air flotation ("DAF") device. The DAF device creates an elongated separation zone to permit agglomerated impurities to be more effectively removed from the influent. A header is included at the lower extent of the separation zone to collect the clarified effluent. In one possible embodiment, a collection channel with a series of intake apertures is connected to the header. In another embodiment, intake apertures are located along the header. In either embodiment, the header reduces the rate at which the effluent is collected and, thereby, reduces the inadvertent collection of agglomerated impurities.

10 Claims, 9 Drawing Sheets

(56) References Cited

U.S. PATENT DOCUMENTS

| | | |
|---|---|---|
| 2011/0114565 A1 | 5/2011 | Roberts et al. |
| 2011/0192801 A1 | 8/2011 | Jeanmarie et al. |
| 2012/0193294 A1 | 8/2012 | Amato et al. |
| 2012/0211407 A1 | 8/2012 | Anderson |
| 2012/0211431 A1 | 8/2012 | Hayes et al. |
| 2012/0211905 A1 | 8/2012 | Hayes |

\* cited by examiner

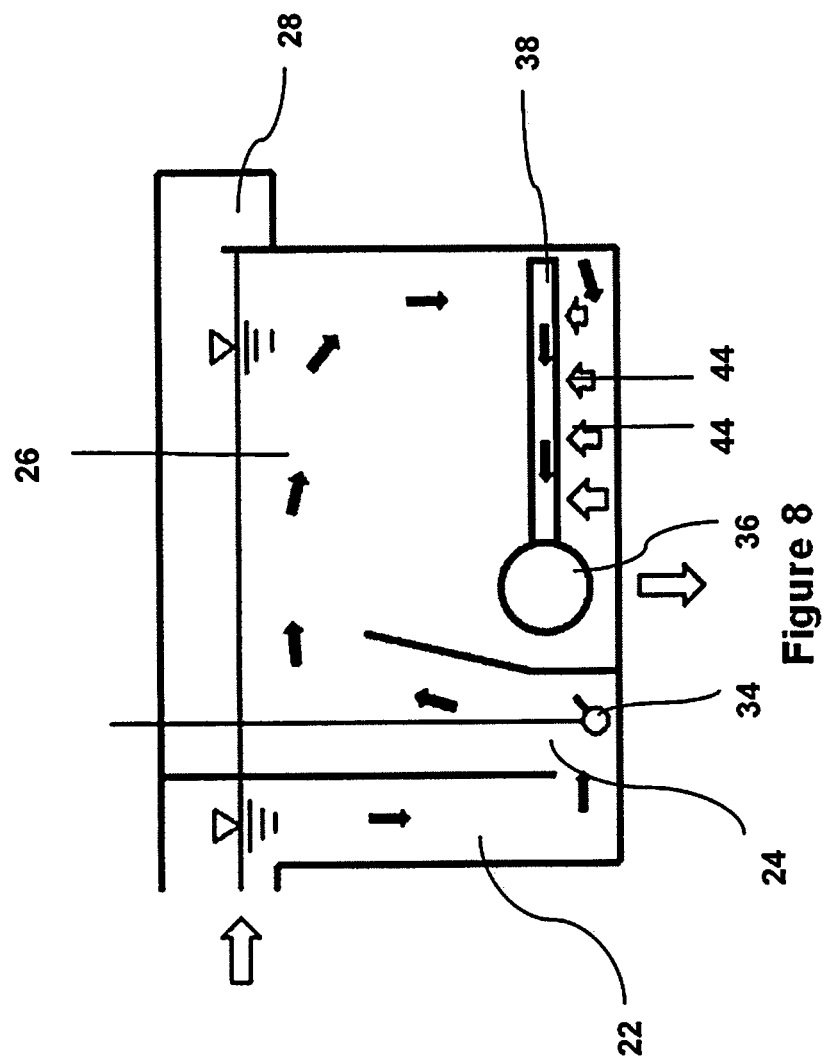

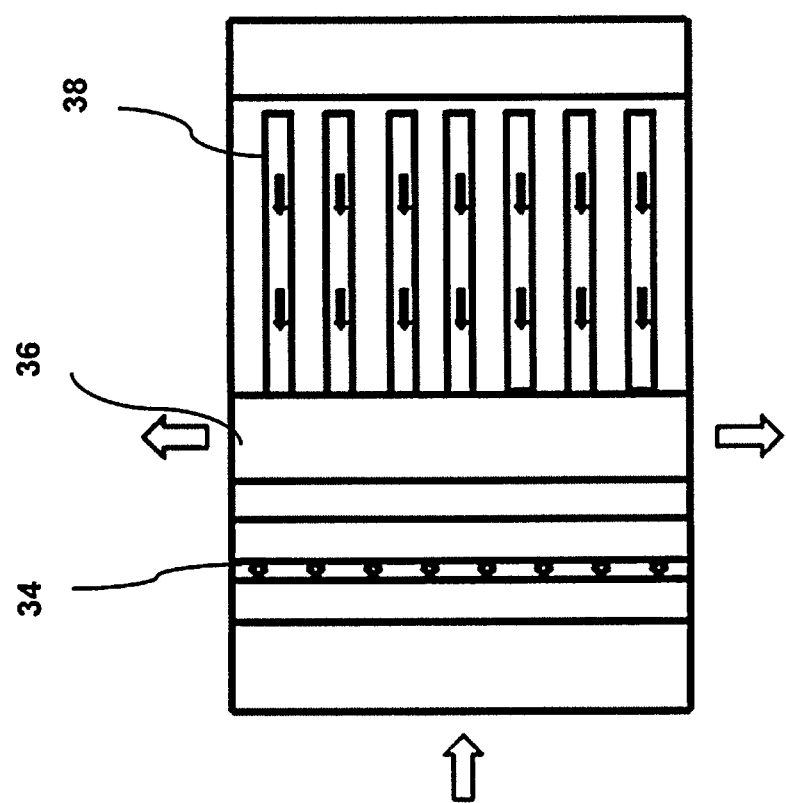

DISSOLVED AIR FLOTATION DEVICE FOR LIQUID CLARIFICATION

TECHNICAL FIELD

This invention relates to a dissolved air flotation (DAF) device for the clarification of water or other liquids as applicable. More particularly the present invention relates to a DAF device that employs a sub-natant collection header for the withdrawal of clarified effluent.

BACKGROUND OF THE INVENTION

A typical dissolved air flotation device is illustrated in FIG. 1. This system comprises of an inlet chamber, a contact zone, a separation zone, and an effluent chamber. The contact zone further includes a micro-bubble injection installation near the device floor. The micro-bubble injection installation typically consists of micro-bubble generating nozzles installed on a nozzle header. The nozzle header receives pressurized liquid saturated with air and distributes it evenly to each nozzle. As the liquid passes the nozzles, micro-bubbles are generated. Furthermore, a micro-bubble injection installation may consist of multiple nozzle headers.

The inlet zone equalizes the incoming flow. The micro-bubbles injected at the bottom of the contact zone attach to the suspended particulates. A well designed contact zone promotes the collision of micro-bubbles with the suspended particles. The inclination of the inlet baffle increases the contact zone area from bottom to top. The increase in contact zone area reduces the flow velocity and therefore turbulence. The particles with one or more micro-bubbles attached, rise to the surface as the liquid flows to the separation zone. The rise of particulates to the surface is accomplished by enhancing the buoyancy via attachment of one or more micro-bubbles. The liquid devoid of suspended particulates and other impurities is removed from the bottom of the separation zone.

The depth of dissolved air flotation installations operating at high surface loading rates is known to be typically more than 4.0 m. Increased depth is known to provide process advantage in terms of clarification efficiency by altering the flow path in the separation zone. However, increased depth also results in high construction costs and maintenance costs.

An example of a dissolved air flotation system is illustrated in U.S. Pat. No. 3,175,687 to Jones. Jones '687 illustrates a flotation tank within which flotation is carried out to form a layer of sludge or float on top of the water within the tank. Aerated water is delivered to the bottom of the tank via a plurality of admission fittings that are disposed lengthwise along the bottom of the tank. A valve is associated with each admission fitting to selectively render the fitting operable or inoperable.

Yet another example of a clarification system is disclosed in U.S. Pat. No. 5,047,149 to Vion. Vion '149 discloses an apparatus for the clarification of liquids such as water. The apparatus includes a feature whereby flotation equipment is placed above an assembly for the pretreatment of the liquid. This allows a hydraulic balance to be brought to the various constitutes of the apparatus. This, in turn, allows for a small upstream load and the recycling, by simple gravity, of the floating particles collected at the surface of the flotation equipment.

A further clarification system is disclosed in U.S. Pat. App. 2009/0211974 to Bonnelye. Bonnelye '974 discloses a water clarifying device including a flotation zone, a membrane-based filtering zone, and an extracting means. The membranes are fed with floated water from down upwards in both the filtering phase and the backwashing phase.

There are significant drawbacks to know clarification systems to be implemented at high loading rates, such as the one illustrated in FIG. 1. Namely, the path between the contact zone and the effluent collection zone is often too short to ensure the removal of all of the agglomerated impurities. As illustrated in the system of FIG. 1, the path between the contact and effluent zones can be a straight line thereby reducing the time for which the liquid containing micro-bubbles is retained in the separation zone. The result of which is the lowermost agglomerated particles receive insufficient flotation time and are thus prevented from floating to the top for removal at the sludge collection chamber. As a result, bubble-particle agglomerates with lower flotation velocities are often carried along with the flow and delivered into the effluent zone. Another drawback concerns the acceleration of flow at the inlet of the effluent zone. This acceleration is often too great and results in the agglomerated particles being dragged into the effluent zone. Both of these drawbacks result in impurities being contained within the effluent.

The DAF devices of the present disclosure seek to overcome these drawback by both increasing the pathway the agglomerated particles must travel within the separation zone—thus permitting additional time for bubble-particle agglomerates with lower flotation velocities to rise to surface and separate, and decreasing the drag at the entrance to the effluent zone. The result is an increase in agglomerated particles that are removed via the sludge collection chamber and a corresponding decrease in impurities found within the effluent. There also exists a need in the art for a dissolved air flotation installation capable of operating at high loading rates that does not require excessive depth to improve the clarification efficiency. Further, there is also a need in the art for a dissolved air flotation system that is more cost effective and the design is capable of being easily incorporated in the existing conventional installations to increase the clarification capacity. The present invention is aimed at fulfilling these and other needs.

SUMMARY OF THE INVENTION

One of the advantages of the present invention is that it provides dissolved air flotation with high clarification rates.

It is a further advantage of the invention is that it greatly minimizes and/or eliminates the passage of micro-bubbles into the effluent by enhancing the flow pattern in the reactor.

Yet another advantage of the present invention is that it allows for high rates of clarification without unnecessarily increasing the depth of the water within the device.

Still yet another advantage is realized by utilizing a header fitted with collection channels to remove the effluent, thereby distributing the intake area over a larger region and thus reducing the drag resulting from fluid flow and therefore the amount of agglomerated particles and bubbles that are introduced into the effluent.

Another advantage is realized by providing a dissolved air flotation system that can be inexpensively installed and maintained and that can be retrofitted into existing water treatment facilities.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and its advantages, reference is now made to the following descriptions, taken in conjunction with the accompanying drawings, in which:

FIG. 8 is a diagrammatic view of an alternative embodiment of the present invention.

FIG. 9 is a diagrammatic top plan view of the embodiment depicted in FIG. 8.

Similar reference characters refer to similar parts throughout the several views of the drawings.

DETAILED DESCRIPTION OF THE DRAWINGS

The present disclosure relates to improvements in dissolved air flotation ("DAF"). The disclosed DAF device increases the path length of bubble-particle agglomerates must travel within the separation zone. This path permits agglomerated impurities to be more effectively removed from the influent. A header is included at the lower extent of the separation zone to collect the clarified effluent. In one possible embodiment, a collection channel with a series of intake apertures is connected to the header. In another embodiment, intake apertures are located along the header. In either embodiment, the header alters the flow pattern in the separation zone, thereby, reduces the inadvertent collection of agglomerated impurities. The various details of the present invention, and the manner in which they interrelate, are described in greater detail hereinafter.

Figure 1:
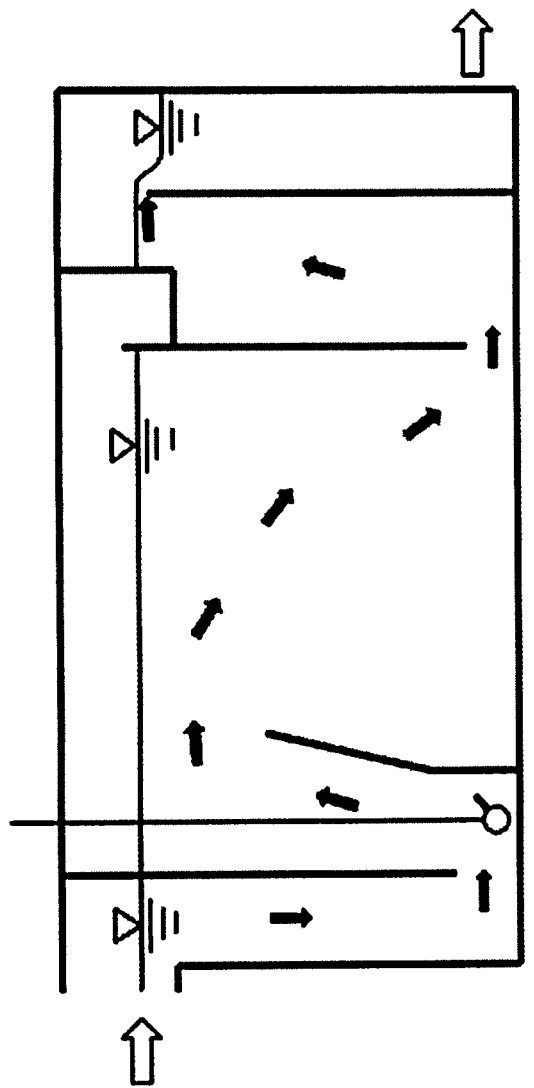
FIG. 1 is a diagrammatic view of a prior art dissolved air flotation device.
Figure 2:
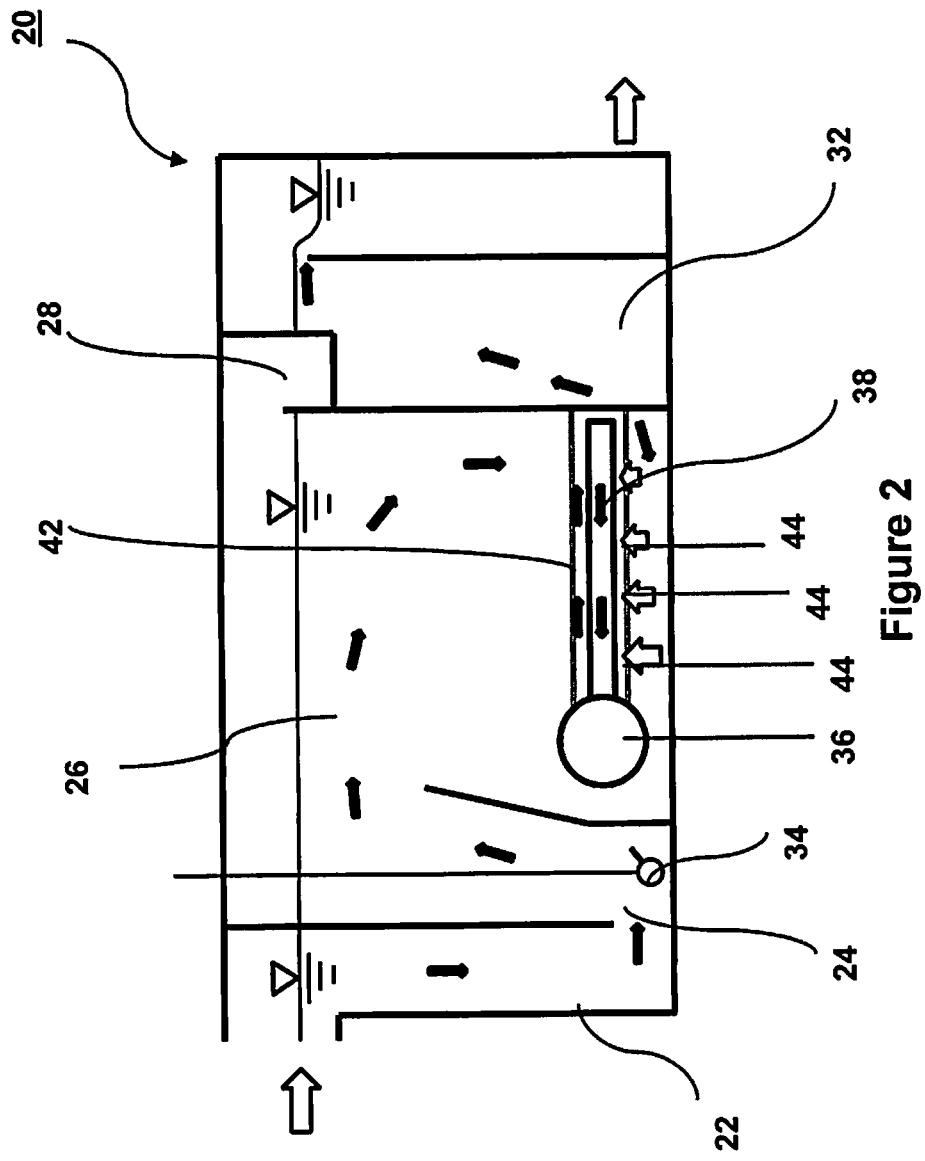
FIG. 2 is a diagrammatic view of the dissolved air flotation device of the present invention.

FIG. 2 illustrates a preferred embodiment of the DAF device 20 of the present invention. Device 20 includes an influent zone 22, a contact zone 24, a separation zone 26, a sludge collection chamber 28, and an effluent zone 32. All of the zones are in fluid communication with one another and the collection chamber. Influent zone 22 includes an inlet to receive a volume of fluid to be clarified. This fluid is most typically water. The water can be purified to create, for example, drinking water. The processing of other fluids, and for other purposes, is within the scope of the present invention. DAF device 20 substantially removes the impurities from the influent to form sludge and a volume of clarified effluent.

Contact zone 24 is defined by upper and lower extents. A series of pressure release nozzles 34 are positioned at the lower extent. Nozzle header 34 receives pressurized liquid saturated with air and distributes it evenly to each nozzle. In the alternative, nozzles 34 may be connected to a pressurized source of air. In either event, as the liquid or air passes the nozzles, micro-bubbles are generated. Ideally, nozzles 34 are sized such that very fine bubbles are created. Once formed, the buoyancy of the bubbles carries them to the top of DAF device 20. While in contact zone 24, the bubbles contact and agglomerating with the impurities in the influent. This results in larger agglomerated particles that are nonetheless buoyant. The inlet baffle to the separation zone 26 is preferably inclined. The inclination of the inlet baffle increases the contact zone area from bottom to top. The increase in contact zone area reduces the flow velocity and therefore turbulence.

From contact zone 24, the agglomerated particles travel into separation zone 26 where they raise to the upper extent of separation zone 26. Collection chamber 28 is positioned adjacent the upper extent of separation zone 26. The agglomerated particles are gathered into the collection chamber as sludge. Once the impurities are removed from the influent, the remaining effluent flows downwardly to the lower extent of separation zone 26.

The effluent is removed from the DAF device by way of a header 36. In the embodiment depicted in FIG. 2, header 36 includes a series of interconnected collection and discharge channels (38 and 42). Both header 36 and the collection and discharge channels (38 and 42) are positioned within the lower extent of separation zone 26. In a preferred by non-limiting example, the collection and discharge channels (38 and 42) are perpendicular to header 36. Each of the collection channels 38 includes a series of intake apertures 44. Intake apertures 44 are arrayed on the bottom of a respective collection channel 38 and therefore face the bottom of separation zone 26 and the DAF device 20. The effluent travels to the very bottom of separation zone 26 before entering the intake apertures 44 within collection channels 38. The effluent is then delivered into header 36. In accordance with the invention, the suction at the outer end of the collection channel 38 (the end opposite header 36) is less than the suction at the inner end of the collection channel 38 (the end adjacent header 36). This pressure differential operates to further the path of the agglomerated particles and allows the agglomerated parties to rise to the collection chamber 28.

Figure 3:
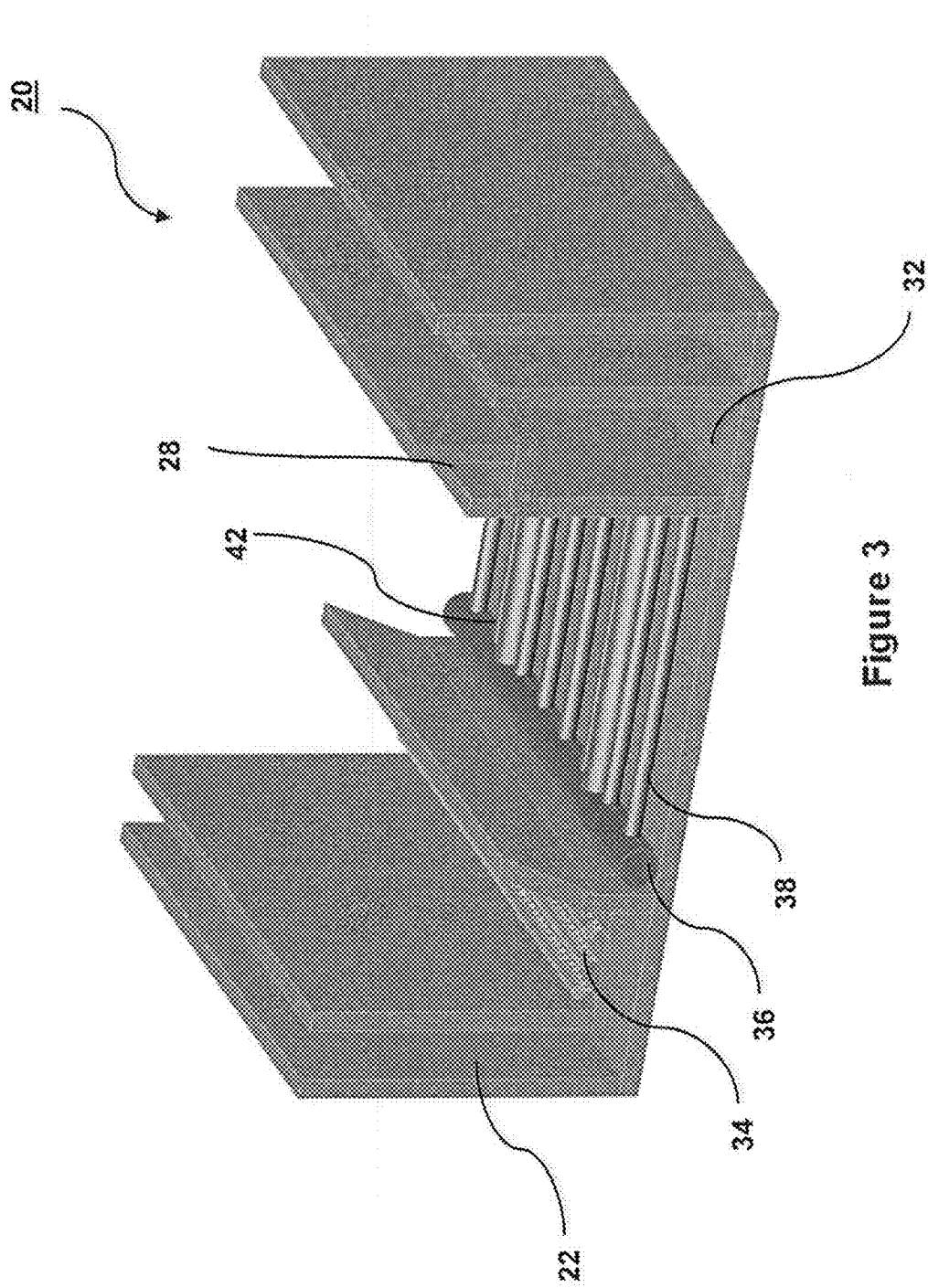
FIG. 3 is a perspective view of the dissolved air flotation device of the present invention.
Figure 4:
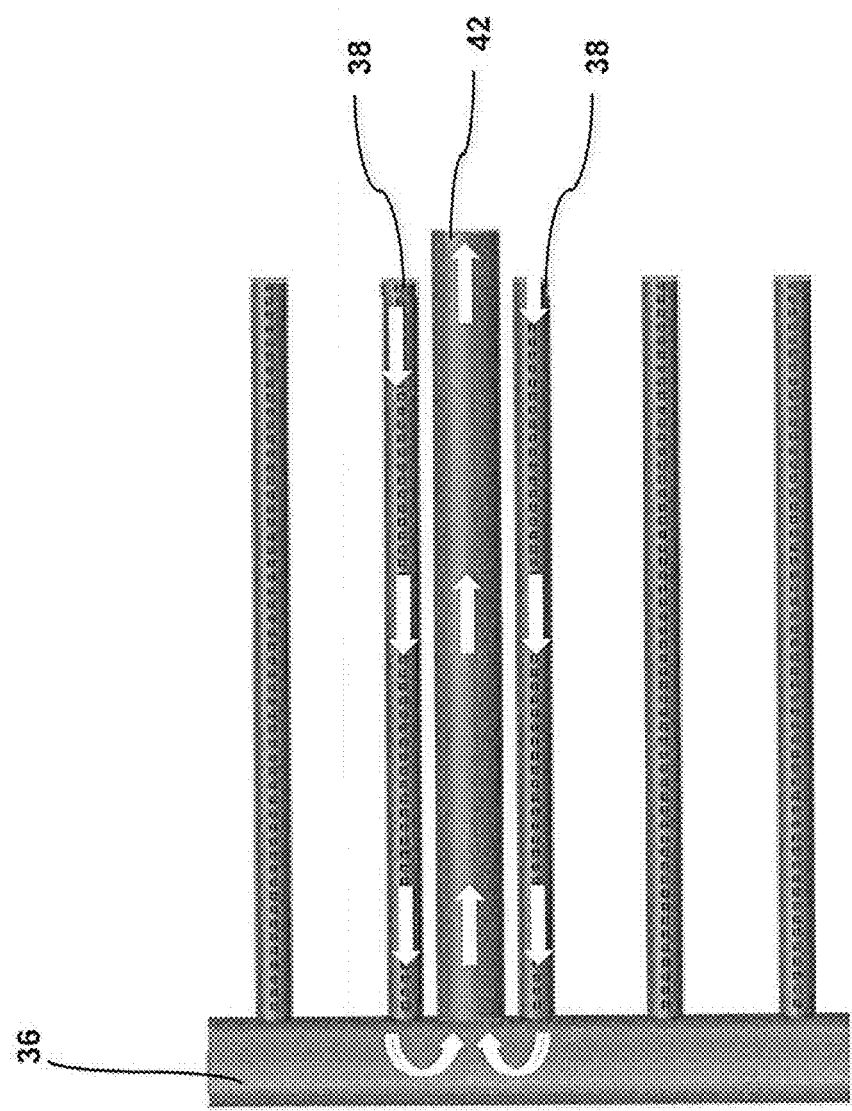
FIG. 4 is a detailed bottom plan view of the effluent collection and discharge channels depicted in FIG. 3.
Figure 5:
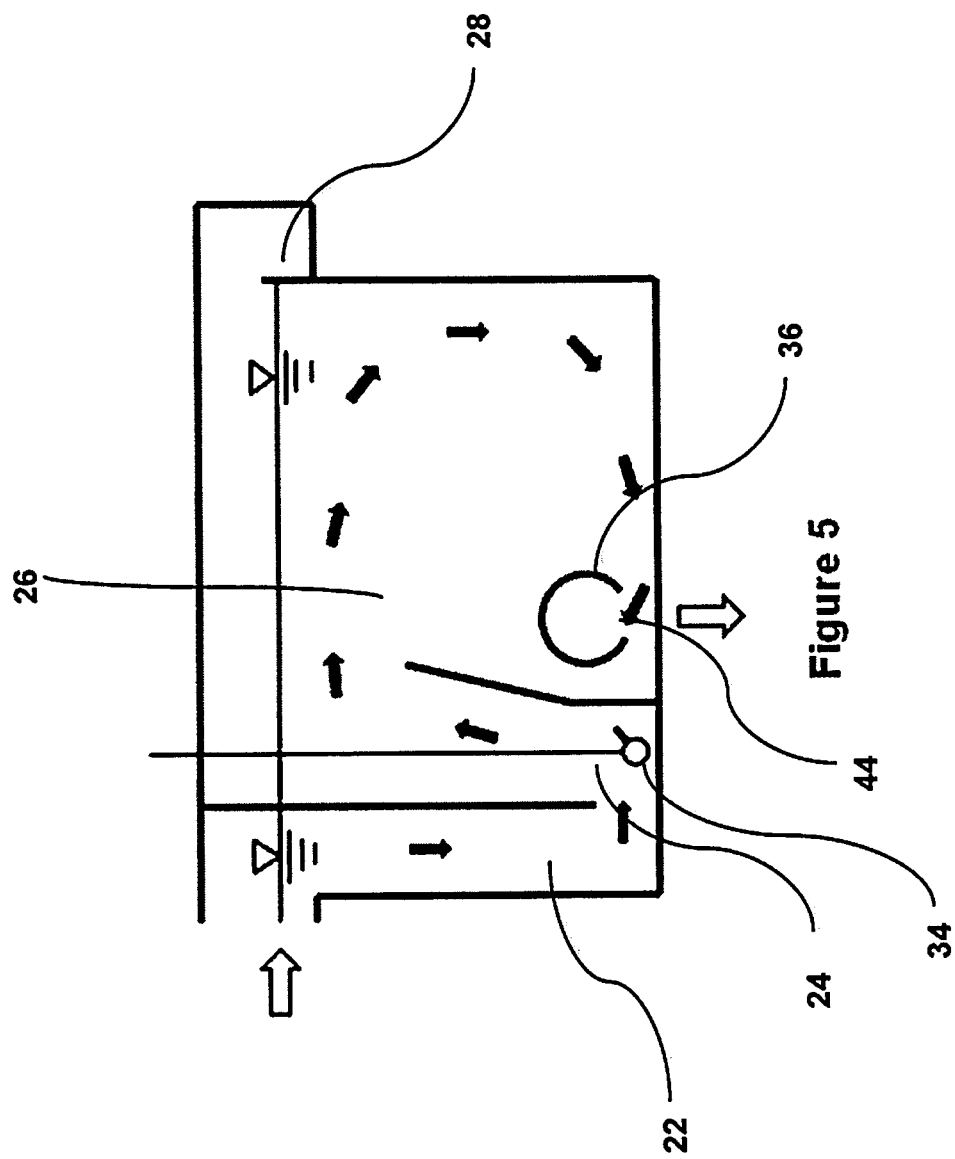
FIG. 5 is a diagrammatic view of an alternative embodiment of the present invention.
Figure 6:
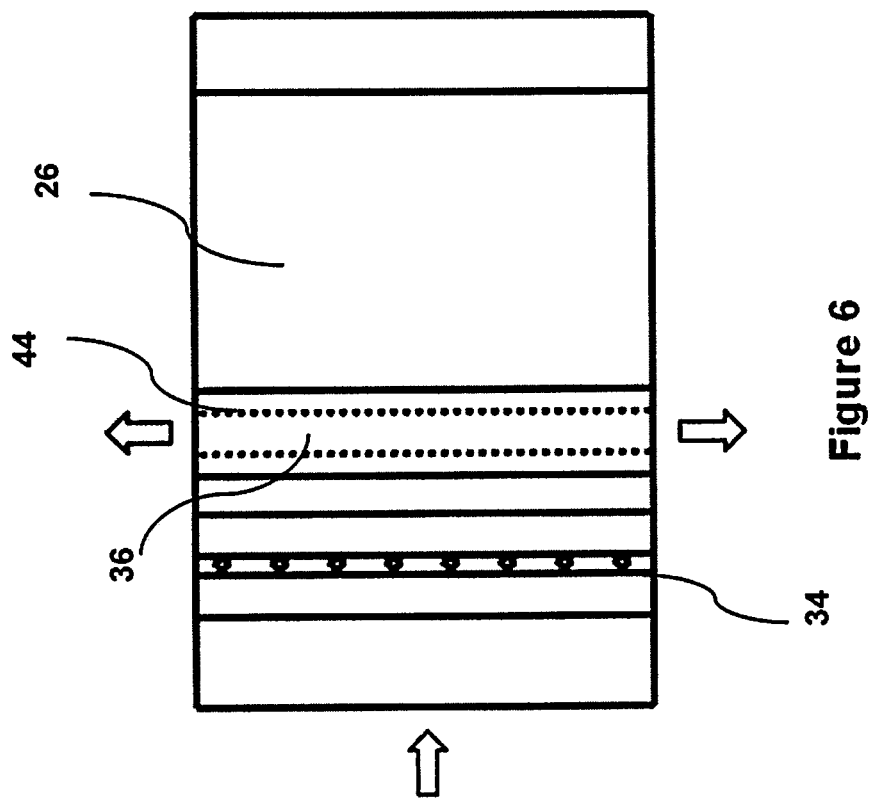
FIG. 6 is a diagrammatic top plan view of the embodiment depicted in FIG. 5.

Once within header 36, the effluent is collected and routed to one of the discharge channels 42. As illustrated in FIGS. 3-4, there are preferably fewer discharge channels 42 but they have an increased diameter. The total volumetric output of the discharge channels 42 should equal the volumetric input of the collection channels 38. Effluent zone 32 is in fluid communication with each of the discharge channels 42. Accordingly, effluent leaving header 36 is delivered to effluent zone 32 by way of the discharge channels 42. This clarified fluid can then be passed to additional processing steps.

Various alternative embodiments are depicted in FIGS. 5-9. In FIG. 9, the collection and discharge channels (38 and 42) have been eliminated. Additionally, the intake apertures 44 are formed along the bottom of header 36 and the opposite ends of header 36 are opened. Thus, effluent is delivered directly into header 36. The effluent then exits through the opposite, opened ends of the header 36 as noted in FIG. 6. Effluent zones 32 are, therefore, formed on either side of the device.

Figure 7:
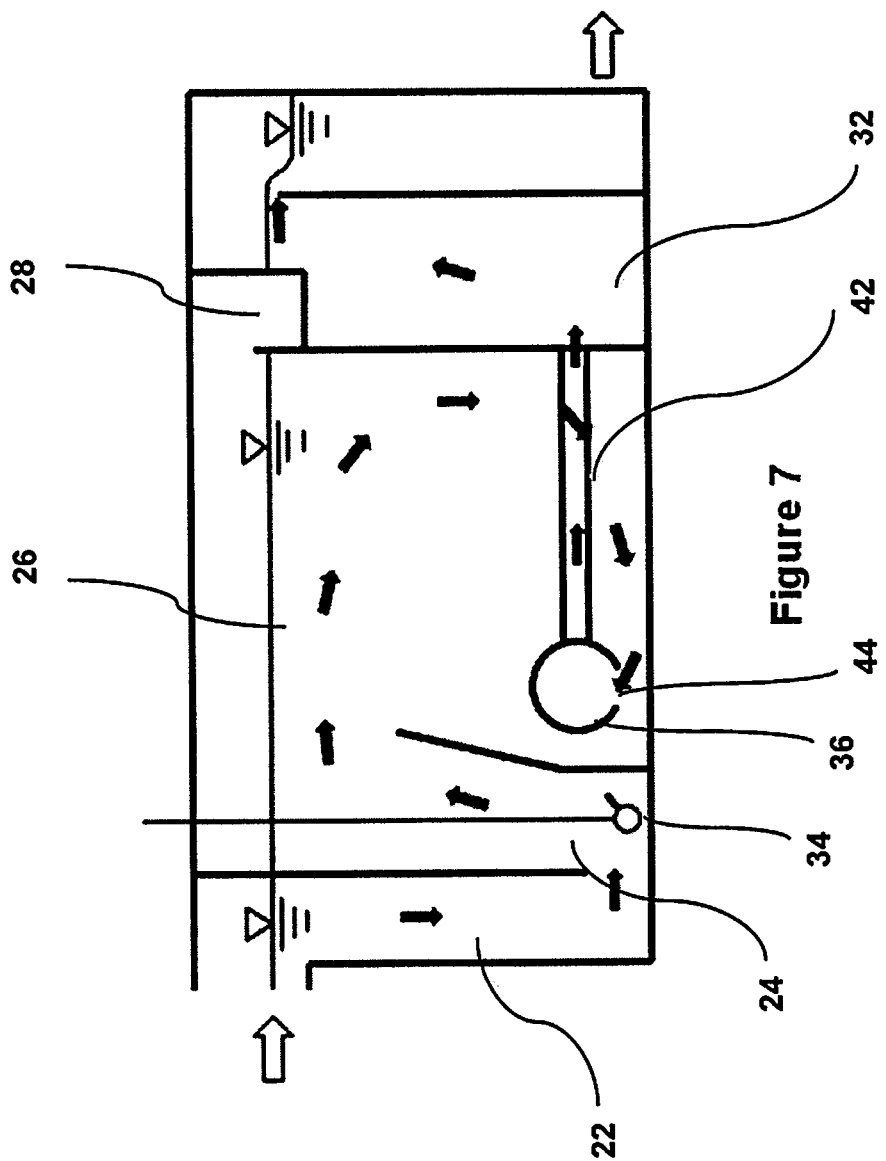
FIG. 7 is a diagrammatic view of an alternative embodiment of the present invention.

FIG. 7 is a further alternative embodiment which is the same in most respects as the primary embodiment. However, header 36 includes discharge channels 42 but no collection channels 38. The effluent is delivered into header 36 via intake apertures 44 formed along the bottom of header 36.

Apertures 44 can be formed as openings, holes, or continuous slits (lengthwise or laterally). Discharge channels 42 then route the collected effluent into effluent zone 32. This embodiment eliminates the need for separate collection channels 38 as well as side mounted effluent zones 32.

In FIG. 8, header 36 includes collection channels 38 but no discharge channels 42. Collection channels 38 are the same as those described in connection with the preferred embodiment. Namely, collection channels 38 include a number of intake apertures 44 formed along their bottom surface. These intake apertures 44 collect effluent, which is then delivered to header 36 via the respective collection channels 38. As most clearly illustrated in FIG. 9, the collected effluent is then delivered to opposing effluent zones via the opposite, opened ends of header 36.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A dissolved air flotation (DAF) device adapted to receive a volume of influent containing impurities, the DAF device substantially removing the impurities to form sludge and a volume of effluent, the DAF device comprising:
    an influent zone for receiving a volume of influent to be clarified;
    a contact zone in communication with the influent zone, the contact zone having upper and lower extents, a series of pressure release nozzles positioned within the lower extent of the contact zone, the nozzles functioning to produce very fine bubbles, the very fine bubbles contacting and agglomerating with the impurities in the influent to form agglomerated particles;
    a separation zone in communication with the contact zone, the separation zone having upper and lower extents, the agglomerated particles rising to the upper extent of the separation zone as sludge, the remaining effluent being directed to the lower extent of the separation zone;
    a collection chamber for collecting the sludge from the upper extent of the separation zone;
    a header positioned within a lower extent of the separation zone and interconnected with a series of collection and discharge channels also positioned within the lower extent of the separation zone, each of the collection channels having a series of apertures to collect effluent from the lower extent of the separation zone, the effluent being delivered to the header by way of the collection channels;
    an effluent zone in communication with the discharge channels, effluent from the header being delivered to the effluent zone by way of the discharge channels.

2. The device as described in claim 1 wherein, the collection channels having a series of apertures along a lower extent to collect effluent and deliver the effluent into the header.

3. The device as described in claim 1 wherein there are more collection channels than discharge channels and wherein the diameter of the discharge channels is greater than the diameter of the collection channels.

4. The device as described in claim 1 wherein the total volumetric intake of the collection channels is equal to the total volumetric output of the discharge channels.

5. The device as described in claim 1 wherein the material of the channels and headers is not limited to steel, plastic, or wood.

6. The device as described in claim 1 wherein the device has a floor and the clearance between the lower extents of the header and collection channel and the device floor is not limited to a certain value.

7. The device as described in claim 1 wherein the collection channels, discharge channels, and the header have weep holes for releasing entrapped air.

8. The device as described in claim 1 wherein the apertures have a screen at the entrance.

9. The device as described in claim 1 wherein the collection channels, discharge channels, and header are not limited to a circular cross section.

10. The device as described in claim 1 wherein the collection and discharge channels are perpendicular to the header.

* * * * *